(12) United States Patent
Wendsjo et al.

(10) Patent No.: US 6,280,881 B1
(45) Date of Patent: Aug. 28, 2001

(54) LITHIUM SECONDARY BATTERY

(75) Inventors: Asa Wendsjo, Odense C; Steen Yde-Andersen, Odense S, both of (DK)

(73) Assignee: Danionics A/S, Odense S. (DK)

( * ) Notice: Subject to any disclaimer, the term of this patent is extended or adjusted under 35 U.S.C. 154(b) by 0 days.

(21) Appl. No.: 09/319,798

(22) PCT Filed: Dec. 19, 1997

(86) PCT No.: PCT/EP97/07275

§ 371 Date: Sep. 7, 1999

§ 102(e) Date: Sep. 7, 1999

(87) PCT Pub. No.: WO98/28812

PCT Pub. Date: Jul. 2, 1998

(30) Foreign Application Priority Data

Dec. 20, 1996 (DK) .................................................. 1459/96

(51) Int. Cl.⁷ ...................................................... H01M 6/22
(52) U.S. Cl. ........................ 429/301; 429/303; 429/308; 429/316; 29/623.1
(58) Field of Search .................... 429/301, 303, 429/306, 308, 316; 29/623.1

(56) References Cited

U.S. PATENT DOCUMENTS

| | | |
|---|---|---|
| 3,894,889 | 7/1975 | Gillman et al. . |
| 5,240,790 | 8/1993 | Chua et al. . |
| 5,296,318 | 3/1994 | Gozdz et al. . |
| 5,470,677 | 11/1995 | Williams et al. . |
| 5,589,295 | 12/1996 | Derzon et al. . |
| 5,665,265 | 9/1997 | Gies et al. ............................ 252/62.2 |
| 5,681,357 * | 10/1997 | Eschbach et al. ................ 429/303 X |
| 5,962,168 * | 10/1999 | Denton .............................. 429/199 X |
| 6,013,393 * | 1/2000 | Taniuchi et al. ....................... 429/317 |
| 6,027,836 * | 10/2000 | Okada et al. ..................... 429/306 X |
| 6,051,342 * | 4/2000 | Hamand et al. ..................... 429/303 |

FOREIGN PATENT DOCUMENTS

| | | |
|---|---|---|
| 0 651 455 | 5/1995 | (EP) . |
| 0 724 305 | 7/1996 | (EP) . |
| 0 798 791 | 10/1997 | (EP) . |
| WO 96/18215 | 6/1996 | (WO) . |
| WO 97/12409 | 4/1997 | (WO) . |

OTHER PUBLICATIONS

Patent Abstracts of Japan, 02020537, Jan. 24, 1990.
Patent Abstracts of Japan, 04267057, Sep. 22, 1992.
Patent Abstracts of Japan, 04366563, Dec. 18, 1992.
RU 2075799 (Uuniv. Sarat Tech. Techn, Inst.) (WPI Abstract) (1997, Mar.).
O. Bohnke, et al., *J. Electrochem. Soc.*, 139:7, pp. 1862–1865, 1992 (Jul.).

* cited by examiner

Primary Examiner—Stephen Kalafut
(74) Attorney, Agent, or Firm—Darby & Darby

(57) ABSTRACT

A lithium secondary battery with an electrolyte containing one or more alkai metal salts, one or more non-aqueous solvents and immobilized by a polymer selected from cellulose acetates, cellulose acetate butyrates, cellulose acetate propionates, polyvinylidene fluoride-hexafluoropropylenes and polyvinylpyrrolidone-vinyl acetates, the polymer preferably being used in an amount of at most 15% by weight based on the weight of the salts, solvents and polymer of the electrolyte system, with the proviso that in the case of polyvinlidene fluoride-hexafluoropropylenes, the polymer is present in an amount of at most 12% by weight based on the weight of the salts, solvents and polymer of the electrolyte system. The immobilized electrolyte does not cause problems with respect to leakage from the cell compartment and the elctrolyte also high conductivity implying a capacity utilization more closely approaching the utilization observed for batteries using liquid electrolyte. The electrolyte is also electrochemically stable.

18 Claims, No Drawings

LITHIUM SECONDARY BATTERY

This invention relates to a lithium secondary battery, and particularly to the electrolyte used therein and to the preparation of the battery.

Recent developments in electrochemical technology have provided systems such as primary and secondary lithium batteries of high specific energy per unit of volume, typically in the range 175–250 Wh/l.

Such secondary batteries are typically based on negative electrode structures of metallic lithium, alloys thereof or on carbons of high lithium intercalation capacity. The positive electrode structures are typically based on transition metal oxides. The electrolyte comprises one or more non-aqueous solvents, and one or more lithium-salts.

The fact that the electrolyte is a liquid at the battery operation temperature may cause safety problems such as electrolyte leakage from the cell compartment. Upon reaction with oxygen and water in the atmosphere, severe corrosion of the battery may occur.

Several attempts have been made to solve this safety issue of lithium based batteries. The traditional approach has been solid polymer electrolytes, i.e. electrolyte structures which are based on ionic conduction within a solid polymer network. Such polymer electrolytes provide batteries of high safety, as no electrolyte leakage can take place.

Polymer electrolytes are described in a number of patents and patent applications, including the following:

EP 724,305 A1 to Sony Corporation, which describes gel electrolytes of a polymer having a side chain to which at least one nitrile group is bonded.

U.S. Pat. No. 5,240,790 to Alliant Techsystems Inc., which covers a gelled electrolyte comprising polyacrylonitrile, preferably of a relative concentration of 12–22 mole percent.

U.S. Pat. No. 5,589,295 to Derzon et al, which describes a thin film electrolyte with a polymeric gel-former selected from the group of polyacrylonitrile and polyvinylidenefluoride.

The drawback of batteries based on such solid polymer electrolytes is reduced capacity and power capability, especially at low temperature. Compared to liquid electrolytes, the conductivity of solid polymer electrolytes is lower, mainly due to reduced ionic mobility. Further, the activation energy for the ionic migration process is higher than for the liquid electrolytes, implying strong conductivity variation with temperature and significantly reduced low-temperature performance. The capacity and power capability are strongly dependent on the electrolyte conductivity; at low conductivity high internal impedance implies high losses and reduced capacity accessability.

Therefore a need exists for secondary lithium batteries based on polymer electrolyte systems, which combine the demands for high safety and high conductivity.

An object of the present invention is to provide a lithium secondary battery which avoids problems with respect to electrolyte leakage from the cell compartment but which also provides high conductivity sufficient for full capacity utilisation, i.e. which does not imply the same reduction in capacity utilisation compared to lithium secondary batteries based on liquid electrolytes that is associated with known polymer electrolytes.

The present invention provides a lithium secondary battery comprising an immobilized electrolyte containing one or more alkali metal salts, one or more non-aqueous solvents and an immobilizing polymer, wherein the immobilizing polymer is selected from the group consisting of cellulose acetates, cellulose acetate butyrates, cellulose acetate propionates, polyvinylidene fluoride-hexafluoropropylenes and polyvinypyrrolidone-vinyl acetates, with the proviso that in the case of polyvinylidene fluoride-hexafluoropropylenes, the polymer is present in an amount of at most 12% by weight based on the weight of the salts, solvents and polymer of the electrolyte system.

Surprisingly, it has been found that lithium secondary batteries which comprise as an electrolyte component an immobilising polymer selected from the group of cellulose acetates, cellulose acetate butyrates, cellulose acetate propionates, polyvinylidene fluoride-hexafluoropropylenes and polyvinylpyrrolidone-vinyl acetates does not cause problems with respect to electrolyte leakage from the cell compartment. Further, the electrolytes of such batteries have a high conductivity implying a capacity utilisation more closely approaching the utilisation observed for batteries using liquid electrolyte. Still further, the electrolytes of such batteries are electrochemically stable, i.e. they are not oxidised or reduced even under the redox conditions observed in high voltage lithium batteries.

Compared to the known technology on polymer electrolyte based secondary batteries referred to above, the polymers used according to the invention are generally present in relatively small amounts, preferably at most 15% by weight based on the weight of the salts, solvents and polymer of the electrolyte system, According to one embodiment of the invention, the cellulose polymers used according to the present invention will usually be present in an amount ranging from 0.1% to 10% by weight of the complete electrolyte system, i.e. the total weight of salts, solvents and polymer, preferably 1% to 8% by weight, more preferably 2% to 5% by weight.

In another embodiment of the invention, the polyvinylidene fluoride-hexafluoropropylenes are present in an amount of from 1% to 12% by weight of the complete electrolyte system, i.e. the weight of salts, solvents and polymer, preferably 2 to 10% by weight, more preferably 4% to 8% by weight. In a still further embodiment of the invention the polyvinylpyrrolidone-vinyl acetates will usually be present in an amount from 1% to 15% by weight of the complete electrolyte system, i.e. the total weight of salts, solvents and polymer, preferably 3% to 12% by weight, more preferably 5% to 10% by weight.

WO 97/12409 to Valence Technology describes "viscosifiers" for electrolytes, which are selected from the group of polyethylene oxide, polypropylene oxide, carboxymethylcellulose and polyvinylpyrrolidone. Although this patent specification describes the use of "viscosifiers" based on a cellulose compound and a polyvinylpyrrolidone, it does not describe the specific immobilising agents cellulose acetates and polyvinylpyrrolidone-vinyl acetates used according to the present invention.

U.S. Pat. No. 5,296,318 to Bell Communications Research discloses an electrolyte comprising a self-supporting film of a copolymer of vinylidene fluoride and hexafluoropropylene. Such copolymer is preferably present in the electrolyte in an amount corresponding to 30 to 80% of the electrolyte. Although the patent describes the use of polyvinylidene fluoride-hexafluoropropylene, it does not describe or suggest the use of this material in amounts as small as 12% or less by weight of the electrolyte system.

The immobilizing properties of the polymers used according to the present invention may be improved by crosslinking.

In a preferred embodiment, the immobilizing properties of the cellulose polymers used according to the invention are improved by crosslinking. In this embodiment, cellulose acetates, cellulose acetate butyrates and cellulose acetate propionates, preferably of high hydroxyl content, for example 3% by weight or more, are mixed with monomers or oligomers, which bear functional groups, and which can be crosslinked upon heat curing or upon exposure to UV-light or electron beams. Such monomers and polymers are preferably selected from urea formaldehyde, melamine and polyisocyanate polymers.

In another preferred embodiment of the invention, the electrolyte of the lithium secondary battery comprises, in addition to the immobilising polymer, one or more solvents selected from organic carbonates, lactones, esters and glymes, more preferably selected from the groups of:

(a) alicyclic carbonates represented by the following general formula:

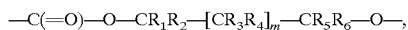

wherein each of $R_1$, $R_2$, $R_3$, $R_4$, $R_5$ and $R_6$ independently represents hydrogen or a $C_1$–$C_4$ alkyl group and m is 0 or 1, preferably ethylene carbonate or propylene carbonate;

(b) aliphatic carbonates represented by the general formula $R_7[OC(O)]_pOR_8$, wherein each of $R_7$ and $R_8$ independently represents a $C_1$–$C_4$ alkyl group, and p is an integer equal to 1 or 2, preferably dimethyl carbonate or diethyl carbonate;

(c) lactones in the form of cyclic esters represented by the general formula:

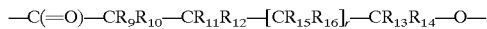

wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1, preferably γ-valerolactone or γ-butyrolactone;

(d) esters represented by the formula $R_{17}[C(O)]OR_{18}$ $[OR_{19}]_t$, wherein each of $R_{17}$, $R_{18}$ and $R_{19}$ independently represent hydrogen or a $C_1$–$C_2$ alkyl group, and t is 0 or an integer equal to 1 or 2, preferably an acetate, more preferably (2-methoxyethyl)-acetate or ethyl acetate;

(e) glymes represented by the general formula $R_{20}O(R_{21}O)_nR_{22}$, in which each of $R_{20}$ and $R_{22}$ independently represents a $C_{1-2}$ alkyl group, $R_{21}$ is —($CR_{23}R_{24}CR_{25}R_{26}$)— wherein each of $R_{23}$, $R_{24}$, $R_{25}$ and $R_{26}$ independently represents hydrogen or a $C_1$–$C_4$ alkyl group, and n is an integer from 2 to 6, preferably 3, $R_{20}$ and $R_{22}$ preferably being methyl groups, $R_{23}$, $R_{24}$, $R_{25}$ and $R_{26}$ preferably being hydrogen or $C_1$–$C_2$ alkyl groups, more preferably hydrogen.

Such solvents may contribute further to the electrochemical stability and ionic conductivity of the electrolyte of the battery.

Any salt commonly employed as an ion-conductive salt in batteries may be used in the electrolyte system according to the invention. Preferably, however, the salt is an alkali metal salt of $ClO_4^-$, $CF_3SO_3^-$, $AsF_6^-$, $PF_6^-$ or $BF_4^-$, or any mixture of such alkali metal or ammonium salts, more preferably $LiAsF_6$, $LiCF_3SO_3$, $LiPF_6$ or $LiBF_4$ or any mixture thereof. Those salts are preferably present in the electrolyte solvents in a concentration from 0.01M to 2.5M, more preferably 0.1M to 1.5M.

In a preferred embodiment of the battery of the invention the electrolyte is incorporated into a porous separator.

Thus the immobilized electrolyte according to the invention is optionally incorporated into a separator which is a porous structure made from a polymer, preferably polyethylene, polypropylene, polycarbonate, cellulose or cellulose derivate, or made from a glass fibre material e.g. boron silicate glass fibre material.

The separator acts as a matrix which confines the physical dimensions of the electrolyte system, thereby enabling the production of thin, self-sustaining and uniform electrolyte membranes. The separator is preferably a woven or non-woven structure having a pore size in the range of 10×10 nm to 1×1 mm and a thickness of 10–100 μm, preferably 10–25 μm. More specifically, the size of the pores can be as in a microporous film (e.g. a Celgard separator) or up to 1×1 mm as in a woven net having a mesh of this size.

The present invention also provides a simple and economically advantageous method for the preparation of the lithium secondary battery of the invention. In general terms, this method comprise the steps of preparing the immobilized electrolyte by mixing the solvents (where more than one solvent is used), dissolving the salt(s) in the solvent mixture, adding an immobilizing agent to the solution, and optionally crosslinking the immobilizing agent.

Thus according to another aspect the present invention provides a method for the preparation of a lithium secondary battery as defined above, comprising the steps of:

mixing the solvents in case the electrolyte comprises more than one solvent, dissolving the salt(s) in the solvent(s) to provide an organic electrolyte, adding the immobilizing polymer and optionally monomers or oligomers having one or more polymerisable functional groups, to the organic electrolyte, if monomers or oligomers are added, inducing polymerisation of these monomers or oligomers, sandwiching the immobilized organic electrolyte between a positive electrode laminate and a negative electrode laminate to form the battery.

Optionally the battery is wound or folded as it is known in the art.

According to a still further aspect, the present invention also provides the use of a polymer selected from the group consisting of cellulose acetates, cellulose acetate butyrates, cellulose acetate propionates, polyvinylidene fluoride-hexafluoropropylenes and polyvinypyrrolidone-vinyl acetates as immobilizing agent for an electrolyte in a lithium secondary battery, with the proviso that in the case of polyvinylidene fluoride-hexafluoropropylenes, the polymer is present in an amount of at most 12% by weight based on the weight of the salts, solvents and polymer of the electrolyte system.

The present invention is illustrated by the following non-limiting examples together with a comparative example.

EXAMPLE 1

A lithium secondary battery was prepared from a negative electrode laminate of a polymer bound carbon coated onto a copper current collector, a positive electrode laminate of a polymer bound lithium manganese oxide spinel coated onto an aluminium current collector, and an electrolyte sandwiched between the electrode laminates.

The carbon was R-LIBA-A (product of Timcal, Switzerland). The lithium magnesium oxide spinel was prepared by a solid state reaction at 800° C. from $Li_2CO_3$ and $MnO_2$ and had a specific capacity of 120 mAh/g. In the case of both electrodes, the polymeric binder was EPDM (ethylene propylene diene polymethylene).

The electrolyte was prepared by:
mixing equimolar amounts of propylene carbonate (PC) and ethylene carbonate (EC)
adding $LiBF_4$ to obtain a 1M solution of $LIBF_4$ in PC/EC
adding cellulose acetate butyrate (CAB) to the solution to obtain a 3% by weight solution of CAB in 1M $LiBF_4$ in PC/EC.
incorporating the above CAB electrolyte in a microporous polyethylene separator The battery prepared had an active electrode area of 365 cm$^2$ and, subsequent to charging to 4.2V, an internal impedance of 49 mΩ at 1 kHz. When cycled between 4.2V and 2.5V at 500 mA, the battery displayed an initial capacity of 358 mAh. After 400 cycles, the capacity was 299 mAh, say 84% of the initial capacity. At 1.25 A discharge rate, an initial capacity of 210 mAh was observed.

Upon nail penetration (Ø=5 mm, F=6000N) the battery short-circuited, however, no leakage of electrolyte was observed on the surface of the battery upon visual inspection.

Comparative Example

A lithium secondary battery was prepared following the same procedure as described in the above example 1, however, 1M $LIBF_4$ in PC/EC was used, i.e. no cellulose acetate butyrate was added to the electrolyte solution.

Such a battery, based on the same electrodes as in example 1 and having the same dimensioanl characteristics as the battery of example 1, had an internal impedance of 49 mΩ at 1 kHz. When cycled between 4.2V and 2.5V at 500 mA, the battery displayed an initial capacity of 408 mAh. After 400 cycles, the capacity was 343 mAh, say 84% of the initial capacity. At 1.25 A discharge rate, an initial capacity of 360 mAh was observed.

Upon nail penetration (Ø=5 mm, F=6000N) the battery short-circuited. Leakage of electrolyte was observed on the surface of the battery upon visual inspection.

EXAMPLE 2

A lithium secondary battery was prepared following the same procedure as described in the above example 1, however, 6% of polyvinylidene fluoride-hexafluoropropylene was substituted for the 3% CAB of example 1.

Upon nail penetration (Ø=5 mm, F=6000N) the battery short-circuited, however, no leakage of electrolyte was observed on the surface of the battery upon visual inspection.

EXAMPLE 3

A lithium secondary battery was prepared following the same procedure as described in the above example 1, however, 8% of polyvinylpyrrolidone-vinyl acetate was substituted for the 3% CAB of example 1.

Upon nail penetration (Ø=5 mm, F=6000N) the battery short-circuited, however, no leakage of electrolyte was observed on the surface of the battery upon visual inspection.

What is claimed is:

1. A lithium secondary battery comprising an immobilized electrolyte containing one or more alkali metal salts, one or more non-aqueous solvents and an immobilizing polymer, wherein the immobilizing polymer is selected from the group consisting of cellulose acetates, cellulose acetate butyrates, cellulose acetate propionates, and polyvinylidene fluoride-hexafluoropropylenes with the proviso that in the case of polyvinylidene fluoride-hexafluoropropylenes, the polymer is present in an amount or at most 12% by weight based on the weight of the salts, solvents and polymer of the electrolyte system.

2. A lithium secondary battery according to claim 1, wherein the immobilizing polymer is present in an amount of at most 15% by weight based on the weight of the salts, solvents and polymer of the electrolyte system.

3. A lithium secondary battery according to claim 1, wherein the polymer is selected from the group consisting of cellulose acetates, cellulose acetate butyrates and cellulose acetate propionates.

4. A lithium secondary battery according to claim 3, wherein the polymer is present in an amount of from 0.1% to 10% by weight based an the weight of the salts, solvents and polymer of the electrolyte system.

5. A lithium secondary battery according to claim 3, wherein the cellulose polymer has a hydroxyl content of 3% by weight or more.

6. A lithium secondary battery according to claim 1, wherein the polymer is mixed with monomers or oligomers selected from urea formaldehyde, melamine and polyisocyanate polymers.

7. A lithium secondary battery according to claim 6, wherein the polymer is crosslinked upon exposure to heat, light or electron radiation.

8. A lithium secondary battery according to claim 1, wherein the polymer is polyvinylidene fluoride-hexafluoropropylene.

9. A lithium secondary battery according to claim 8, wherein the polymer is present in an amount of from 1% to 12% based on the weight of the salts, solvents and polymer of the electrolyte system.

10. A lithium secondary battery according to claim 1, wherein the polymer is present in an amount of from 1% to 15% by weight based on the weight of the salts, solvents and polymer of the electrolyte system.

11. A lithium secondary battery according to claim 1, wherein the electrolyte comprises one or more of the following solvents (a) to (e):

(a) alicyclic carbonates represented by the following general formula:

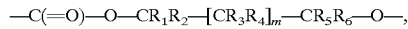

wherein each of $R_1$, $R_2$, $R_3$, $R_4$, $R_5$ and $R_6$ independently represents hydrogen or a $C_1$–$C_4$ alkyl group and m is an 0 or 1;

(b) aliphatic carbonates represented by the general formula: $R_7[OC(O)]_pOR_8$, wherein each of $R_7$ and $R_8$ independently represents a $C_1$–$C_4$ alkyl group, and p is an integer equal to 1 or 2;

(c) lactones in the form of cyclic esters represented by the general formula:

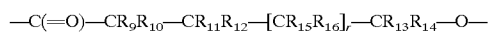

wherein each of $R_9$, $R_{10}$, $R_{11}$, $R_{12}$, $R_{13}$, $R_{14}$, $R_{15}$ and $R_{16}$ independently represents hydrogen or a $C_{1-2}$ alkyl group and r is 0 or 1;

(d) esters represented by the formula $R_{17}[C(O)]OR_{18}[OR_{19}]_t$, wherein each of $R_{17}$, $R_{18}$ and $R_{19}$ independently represents hydrogen or a $C_1$–$C_2$ alkyl group, and t is 0 or an integer equal to 1 or 2;

(e) glymes represented by the general formula $R_{20}O(R_{21}O)_nR_{22}$, in which each of $R_{20}$ and $R_{22}$ independently represents a $C_{1-2}$ alkyl groups, $R_{21}$ is —$(CR_{23}R_{24}CR_{25}R_{26})$— wherein each of $R_{23}$, $R_{24}$, $R_{25}$ and $R_{26}$ independently represents hydrogen or a $C_1$–$C_4$ alkyl groups, and n is an integer from 2 to 6.

12. A lithium secondary battery according to claim 1, wherein the electrolyte comprises one or more salts selected from the group of alkali metal or ammonium salts of $ClO_4^-$, $CF_3SO_3^-$, $AsF_6^-$, $PF_6^-$ or $BF_4^-$.

13. A battery according to claim 12, wherein the salts are present in the electrolyte solvent(s) in a concentration from 0.01M to 2.5M.

14. A lithium secondary battery according to claim 1, wherein the electrolyte is confined in a separator consisting of a porous structure made of a polymer or made of a glass fibre material.

15. A lithium secondary battery according to claim 14, wherein the separator is a woven or non-woven structure having a pore size in the range of 10×10 nm to 1×1 mm.

16. A lithium secondary battery according to claim 14, wherein the separator has a thickness of 10–100 μm.

17. A method for the preparation of a lithium secondary battery according to claim 1, comprising the steps of:

mixing the solvents in case the electrolyte comprises more than one solvent, dissolving the salt(s) in the solvent(s) to provide an organic electrolyte, adding the immobilizing polymer and optionally monomers or oligomers having one or more polymerisable functional groups, to the organic electrolyte, if monomers or oligomers are added, inducing polymerisation of these monomers or oligomers, sandwiching the immobilized organic electrolyte between a positive electrode laminate and a negative electrode laminate to form the battery.

18. A method of immobilizing an electrolyte in a lithium secondary battery comprising an electrolyte system which includes salts, solvents and polymer, said method comprising combining the electrolyte with a polymer selected from the group consisting of cellulose acetates, cellulose acetate butyrates, cellulose acetate propionates and polyvinylidene fluoride-hexafluoropropylenes with the proviso that when the polymer is polyvinylidene fluoride-hexafluoropropylenes, the polymer is present in an amount of at most 12% by weight based on the weight of the salts, solvents and polymer of the electrolyte system.

* * * * *